United States Patent
Tayloe et al.

(10) Patent No.: US 8,504,082 B2
(45) Date of Patent: Aug. 6, 2013

(54) INCREASING SYSTEM CAPACITY VIA UTILIZATION OF END USER EQUIPMENT KNOWLEDGE

(75) Inventors: Daniel R. Tayloe, Phoenix, AZ (US); Chih-Ming J. Chiang, Chandler, AZ (US)

(73) Assignee: Motorola Mobility LLC, Libertyville, IL (US)

( * ) Notice: Subject to any disclaimer, the term of this patent is extended or adjusted under 35 U.S.C. 154(b) by 1138 days.

(21) Appl. No.: 11/745,712

(22) Filed: May 8, 2007

(65) Prior Publication Data

US 2008/0280606 A1 Nov. 13, 2008

(51) Int. Cl.
- H04W 40/00 (2009.01)
- H04W 72/00 (2009.01)
- H04W 4/00 (2009.01)
- H04B 7/216 (2006.01)

(52) U.S. Cl.
USPC ........... 455/466; 455/447; 455/450; 370/320; 370/329

(58) Field of Classification Search
USPC ............... 455/447, 435.1, 450; 370/335, 329, 370/209, 320, 248, 250, 252; 702/182, 179
See application file for complete search history.

(56) References Cited

U.S. PATENT DOCUMENTS

| | | | |
|---|---|---|---|
| 6,542,484 B1 | 4/2003 | Ovesjo et al. | |
| 6,788,657 B1 * | 9/2004 | Freiberg et al. | 370/328 |
| 6,996,056 B2 | 2/2006 | Chheda et al. | |
| 7,072,380 B2 | 7/2006 | Ozluturk et al. | |
| 7,940,738 B2 * | 5/2011 | Gubeskys et al. | 370/342 |
| 2002/0146029 A1 | 10/2002 | Kavak et al. | |
| 2005/0143121 A1 | 6/2005 | Huh et al. | |
| 2006/0083290 A1 * | 4/2006 | Shin et al. | 375/131 |
| 2009/0010213 A1 * | 1/2009 | Yamada et al. | 370/329 |

* cited by examiner

*Primary Examiner* — Nizar Sivji

(57) ABSTRACT

A method and information processing system are provided for dynamically encoding a control channel for transmitting messages to a wireless device based on performance capability information associated with the wireless device. The method includes determining that a wireless device (104) has registered with a base station (116). A device profile (128) associated with the wireless device (116) is retrieved from a register (122). A set of performance capabilities associated with the wireless device is determined (408) in response to the retrieving. A coding type for a control channel for sending messages to the wireless device (104) is determined (410) based on the set of performance capabilities associated with the wireless device (104).

12 Claims, 3 Drawing Sheets

INCREASING SYSTEM CAPACITY VIA UTILIZATION OF END USER EQUIPMENT KNOWLEDGE

FIELD OF THE INVENTION

The present invention generally relates to the field of wireless communications, and more particularly relates to encoding control channels based on wireless device type and/or capabilities.

BACKGROUND OF THE INVENTION

Many Third and Fourth Generation ("4G") wireless networks such as Evolution-Data Optimized ("EV-DO") networks (and earlier generation networks) use a control channel to send signaling information such as pages, channel assignments, and SMS messages. The use of a control channel to send such information diminishes the bandwidth available to the system for main user data traffic. EV-DO networks use repetition to set both channel throughput and signaling reliability. For example, a 38.4 Kbps control channel rate is set by repeating all messages 16 times, while a 76.8 kbps rate is set by repeating all messages 8 times. One problem with this method is that all messages to all users are sent using the lowest common denominator rate. This control channel rate is selected to reliably reach even the most marginally equipped user; however, user equipment capability can vary greatly.

For example, some user equipment can have a lower noise figure, be Multiple Inputs Multiple Outputs ("MIMO") equipped, have a single antenna, and the like. Even with single or diversity antennas, the individual antenna gain can vary several decibels from one antenna type to another, and some mobiles might have higher or lower transmit capabilities than others. Therefore, using a single control channel rate message for all users unnecessarily consumes more system bandwidth than what is required.

Therefore a need exists to overcome the problems with the prior art as discussed above.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
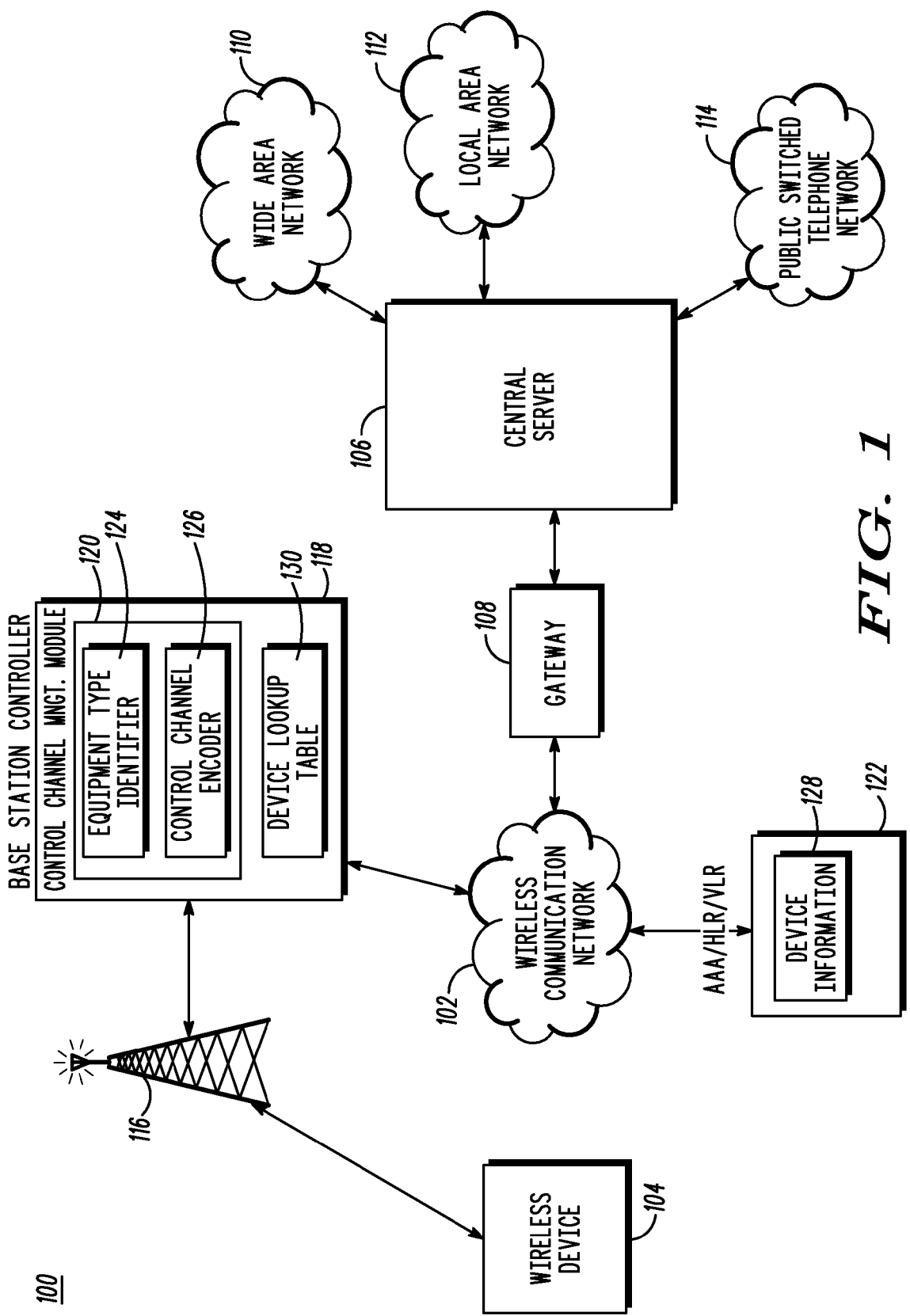
FIG. 1 is block diagram illustrating a wireless communications system, according to an embodiment of the present invention.

Briefly, in accordance with an embodiment of the present invention, disclosed are a method, and information processing system/base station controller for determining a coding type to be used to dynamically encode a control channel for transmitting messages to a wireless device. The method includes determining that the wireless device has registered with a base station. A device profile associated with the registered wireless device is retrieved. The device type and a set of performance capabilities associated with the registered wireless device are determined in response to the retrieving. A coding type for a control channel for sending messages to the registered wireless device is determined based on the device type and set of performance capabilities associated with the wireless device.

In another embodiment an information processing system/base station controller for determining a coding type to be used to dynamically encode a control channel for transmitting messages to a wireless device is disclosed. The information processing system/base station controller includes a memory and a processor that is communicatively coupled to the memory. The information processing system/base station controller also includes a Control Channel Management Module (CCMM) that is communicatively coupled to the memory and the processor. The CCMM is adapted to determine that a wireless device has registered with a base station. A device profile associated with the registered wireless device is retrieved. The device type and a set of performance capabilities associated with the registered wireless device are determined in response to the retrieving. A coding type for a control channel for sending messages to the registered wireless device is determined based on the device type and set of performance capabilities associated with the wireless device.

An advantage of the foregoing embodiments of the present invention is that the encoding for control channel messages associated with a wireless device can be dynamically adjusted based on the device type, network performance statistics, and the like. Control channel message encoding is no longer required to be based upon a worst case scenario. By taking into account the device type of a recipient wireless device, the overhead associated with these messages is decreased and bandwidth for use by the data channels can be increased.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

High Level View of a Wireless Communications System

According to an embodiment of the present invention as shown in FIG. 1, a high level view of a wireless communications system 100 is illustrated. FIG. 1 shows a wireless communication network ("network") 102 that connects one or more wireless communication devices 104 to one another, various networks, and the like. The network 102, according to the present example, comprises a mobile phone network, a mobile text messaging device network, a pager network, or the like.

The network 102 of FIG. 1 can conform to 3G or 4G standards or any past, present, or future wireless communication standard. For example, in one embodiment, the network 102 may implement protocols of any one of the following standards, Code Division Multiple Access (CDMA), Time Division Multiple Access (TDMA), Global System for Mobile Communications (GSM), General Packet Radio Service (GPRS), Frequency Division Multiple Access (FDMA), IEEE 802.16 family of standards, Orthogonal Frequency Division Multiplexing (OFDM), Orthogonal Frequency Division Multiple Access (OFDMA), Wireless LAN ("WLAN"), WiMAX, LTE, UMB, IDEN, or the like. Additionally, the network 102 may operate in accordance with text messaging standards, for example, Short Message Service (SMS), Enhanced Messaging Service (EMS), Multimedia Messaging Service (MMS), or the like. The network 102 also allows for push-to-talk over cellular communications between capable wireless communication devices.

The network 102 supports any number of wireless communication devices 104 such as smart phones, text messaging devices, handheld computers, pagers, beepers, wireless communication cards, personal computers with wireless communication adapters, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities.

In one embodiment, the network 102 is capable of broadband wireless communications utilizing time division duplexing ("TDD") as set forth, for example, by the IEEE 802.16e standard. The IEEE 802.16e standard is further described in IEEE Std. 802.16e 2005. The duplexing scheme TDD allows for the transmissions of signals in a downstream and upstream direction using a single frequency. It should be noted that the present invention is not limited to an 802.16e system for implementing TDD. Other communication systems that the present invention may be applied to include systems utilizing standards such as UMTS LTE (Long Term Evolution), IEEE 802.20, and the like.

Furthermore, the wireless communications system 100 is not limited to a system using only a TDD scheme. For example, TDD may be used only for a portion of the available communication channels in the system 100, while one or more schemes are used for the remaining communication channels. In one embodiment, the wireless communication devices 104 are capable of wirelessly communicating data using the 802.16e standard or any other communication scheme that supports TDD. In another embodiment, the wireless communication devices 104 are capable of wireless communications using other access schemes in addition to TDD.

The wireless communication system 100 includes one or more information processing systems 106 such as a central server communicatively coupled to the network 102 via a gateway 108. The information processing system 106 maintains and process information for all wireless devices 104 communicating on the network 102. Additionally, the information processing system 106 communicatively couples the wireless communication devices 104 to a wide area network 110, a local area network 112, and a public switched telephone network 114 through the network 102 via a gateway 108. Each of these networks has the capability of sending data, such as a multimedia text message, to the wireless devices 104.

The wireless communications system 100 includes a group of base stations 116; however, only one base station 116 has been shown for simplicity. Each base station is communicatively coupled to a base station controller ("BSC") 118. In one embodiment, the BSC 118 receives measurements from wireless devices, allocates radio channels, controls handovers between base stations, and the like. Generally, a single BSC 118 controls a plurality of base stations. In one embodiment, the BSC 118 includes a CCMM 120 that encodes control messages broadcasted to a wireless device based on various parameters associated with the wireless device. Such parameters may include equipment type of a wireless device, network performance statistics (capabilities) associated with the wireless device, and the like. Therefore, in accordance with the invention, control channel messages are not required to be encoded based upon a worst performing wireless device. The number of message repeats can be reduced for various wireless devices thereby reducing the amount of bandwidth used for control messages and increasing the total bandwidth available for user data traffic. The CCMM 120 is discussed in greater detail below.

The wireless communications system 100 includes other various network components 122 such as AAA (Authentication, Authorization, Accounting), a Home Location Register ("HLR"), a Visitor Location Register ("VLR"), and the like. It should be noted that FIG. 1 shows the AAA, HLR, and VLR grouped together for simplicity. Each of these components can be separate entities as would be known to one of ordinary skill in the art. An AAA can comprise a home AAA and a serving AAA that are responsible for service authentication, authorizations, and accounting. An AAA accesses a subscriber profile database to obtain information from a subscription profile associated with a wireless device.

An HLR helps route calls, SMS messages, and the like and ensures security. An HLR can include an authentication center (not shown). The authentication center comprises a database that includes information associated with a wireless device subscriber or network. In one embodiment, subscriber information consists of access right(s) and/or a service(s) subscribed to by the wireless device 106. An HLR record can include an International Mobile Subscriber Identity associated with a wireless device. A VLR serves a single base station and acts as a temporary database for roaming wireless devices. A VLR can obtain information associated with a wireless device either from the HLR or directly from the device itself.

Control Channel Encoding

As discussed above, the CCMM 120, in one embodiment, encodes a control channel associated with a wireless device based on the equipment type of the wireless device, network performance statistics of the wireless device, and/or the like. In one embodiment, the CCMM 120 includes an equipment type identifier 124 and a control channel encoder 126. The equipment type identifier 124 determines the equipment type of a wireless device by requesting subscriber data from the AA/VLR/HLR 122. For example, the equipment type identifier 124 can request device information 128 such as International Mobile Subscriber Identity ("IMSI") or International Mobile Equipment Identity ("IMEI") information associated with a particular device from the AAA/VLR/HLR.

The CCMM 120 uses this information to determine the mobile device type and an associated broadcast message coding type. For example, the BSC 118 can include an optional device table 130 that includes equipment type information associated with wireless devices. Equipment type information can include wireless device model information, antenna information, software information, and the like. The device table 130 can also include network performance information associated with a particular model type or a particular wireless device. For example, network performance information can be monitored for each wireless device or its equipment type and stored at the BSC 118. This information can also be stored on a separate component and provided to the BSC 118 at various time intervals. Alternatively, network performance information may be gathered and analyzed in real time. In such a scenario, the CCMM 120 uses the gathered network performance statistics for the wireless device in conjunction with the mobile device type to determine the coding type for transmitting messages to the mobile device.

One example of information that can be associated with a wireless device or device type in the device table 130 is throughput. Throughput differences between wireless devices or types can be converted to coding differences by analyzing the system link curve C/I requirements closest to the average for each equipment ID. In many cases an exact match does not exist so interpolation can be used to identify an equivalent C/I. In one embodiment, a worst performing equipment type is mapped to the longest coding rate.

It should be noted that using throughput as a radio frequency performance metric is only one non-limiting example. In a system that uses different QoS classes, throughput records examined may be limited to best efforts data sessions such as FTP, web, and the like as high QoS flows such as VoIP has a constant throughput regardless of wireless device performance. Other metrics can also be used based on the wireless communication system. For example, in a CDMA EVDO system a metric such as mobile requested forward slot size (i.e., requested Data Rate Control (DRC)) can also be used to determine what channel coding is to be used for a wireless device. Reported pilot power can be averaged and used as a metric. Another metric example is instantaneous throughput, which is a variation of forward throughput that averages the bytes sent over the number of air interface slots used rather than the over-the-clock time used to send the bytes.

Based upon the identified device type, the particular device, and/or the device's network performance history, the CCMM 120 can determine a broadcast message coding type. In other words, the channel coding of messages sent to a wireless device can be adjusted based on the device type, network performance of the device, and the like. If a wireless device (or device type) is not listed in the device table 130, the wireless device is assigned the longest coding type by default. A wireless device or device type may not be listed in the device lookup table 130, for example, if the device is rare, old, or new. In one embodiment of the invention, the broadcast message coding type for a particular device or device type may be stored in the device table 130 once determined as described above.

The ability to adjust channel coding for messages sent over a broadcast channel overcomes the hurdle of having to encode channels based on a worst case scenario, i.e., encode messages based on the worst performing device. This decreases the amount of bandwidth used for the control channel and increases bandwidth for main user data traffic. In a current CDMA system using a 38.4 Kbps channel, for example, a message is repeated 16 times to accommodate worst case scenario devices. The present invention takes into account device types and therefore can adjust the coding of a message to have less than 16 repeats on a 38.4 Kbps channel. It should be noted that CDMA and a 38.4 Kbps channel are used only as examples and are not limiting.

The control channel encoder 126 of the BSC 118 can either encode a message directly or pass the determined coding type to the base station 116 with a message to be sent to the mobile over the broadcast channel. In one embodiment, the base station 116, can set a flag in one of its standard information broadcast messages to indicate to a recipient wireless device that the message coding is either standard or enhanced (specific to the device). This broadcast status flag notifies the wireless device to expect a particular message encoding. Alternatively, the channel coding to be expected by a wireless device can be hard coded or programmed over the air into the wireless device based upon the device type of the wireless device.

Information Processing System/Base Station Controller

Figure 2:
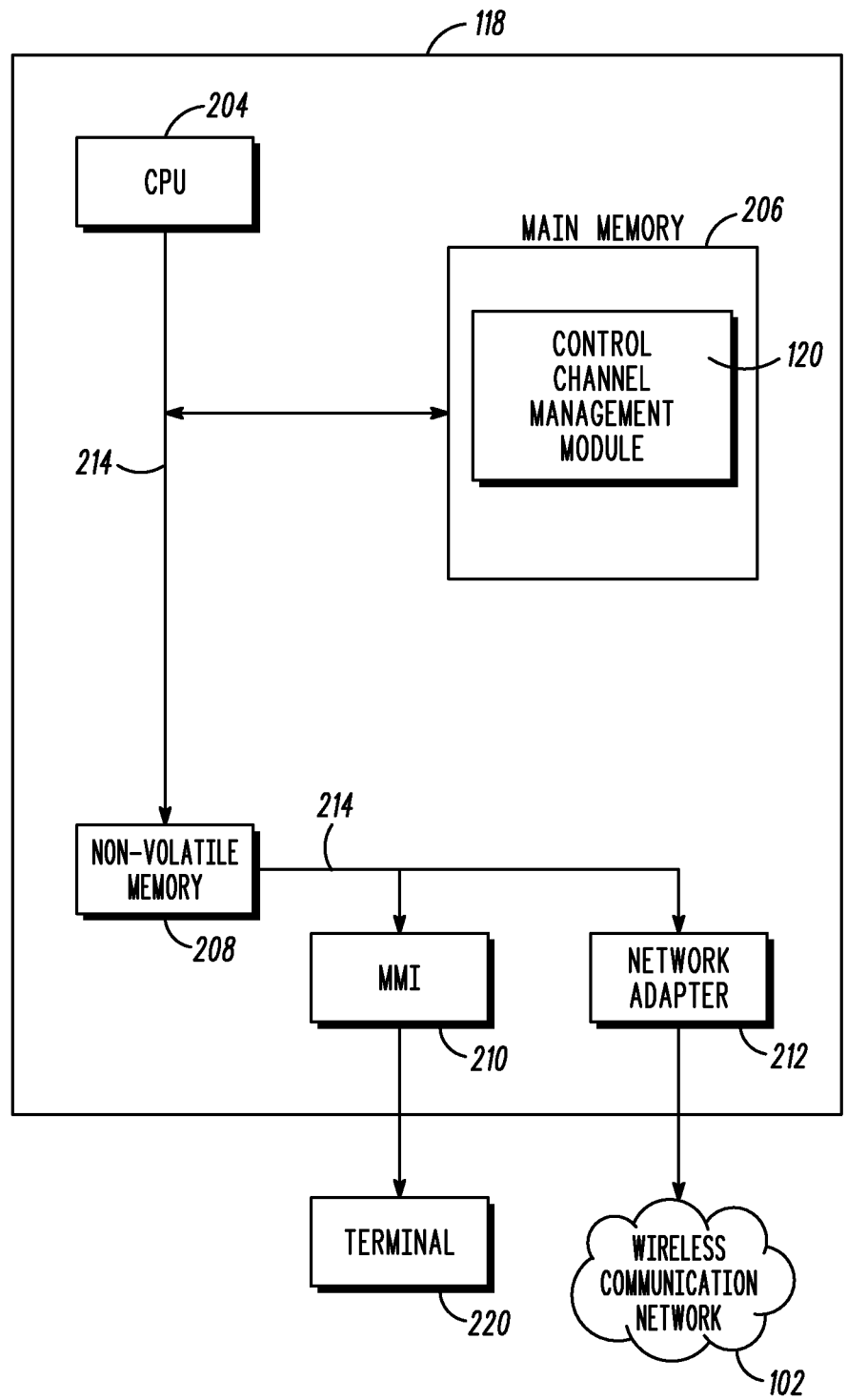
FIG. 2 is a block diagram illustrating a detailed view of an information processing system according to an embodiment of the present invention.
Figure 3:
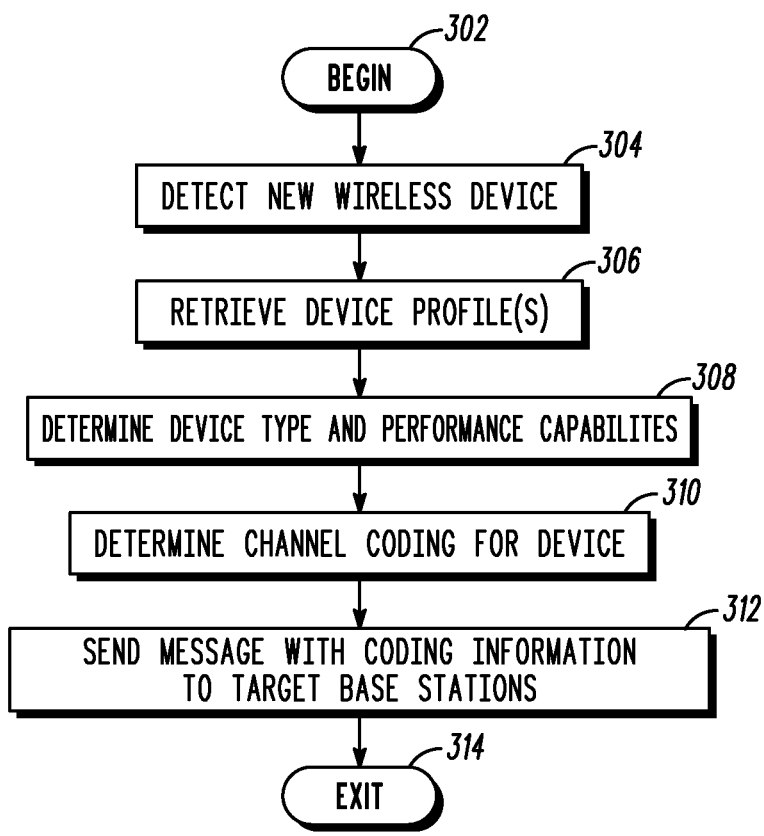
FIG. 3 is an operational flow diagram illustrating a process of determining a coding type to be used to dynamically adjust the encoding of a control channel based on the type and/or performance capabilities of a device to receive the data according to an embodiment of the present invention.

FIG. 2 is a block diagram illustrating a more detailed view of an information processing system such as the base station controller 118 according to an embodiment of the present invention. The base station controller 118 controls one or more base stations 116. The base station controller 118 includes a processor 204 that is connected to a main memory 206 (e.g., volatile memory), non-volatile memory 208, a man-machine interface ("MMI") 210, and network adapter hardware 212. A system bus 214 interconnects these system components. The main memory 206 includes the CCMM 120 discussed above. For simplicity, components of the CCMM 120 such as the equipment type identifier 124, control channel encoder 126, and the device table 130 are not shown. These components have been discussed in greater detail above.

The man-machine interface 210 allows for an administrator, repair crew, or the like to couple a terminal 220 to the base station controller 118. The network adapter hardware 212 is used to provide an interface to the network 102. In one embodiment, the network adapter 216 provides a connection such as an Ethernet connection between the base station controller 118 and the network 102. An embodiment of the present invention can be adapted to work with any data communications connections including present day analog and/or digital techniques or via a future networking mechanism.

Process of Encoding a Control Channel Based on a Device Type

FIG. 4 is an operational flow diagram illustrating a process of dynamically adjusting the encoding of a control channel based on the type and/or performance capabilities of a device to receive the data. The operational flow diagram of FIG. 4 begins at step 302 and flows directly to step 304. At step 304, a new wireless device 104 is detected to have registered at a base station 116. At step 306, the BSC 118 retrieves the registered device profile(s) 128 from the HLR/VLR 122. Based on the information retrieved from the HLR/VLR 122 the BSC 118, at step 308, determines the registered device type and performance capabilities.

At step 310, channel coding for the registered device is determined. In one embodiment, channel encoding is determined by the BSC 118 cross referencing the device type and/or capabilities with a device table 130. In another embodiment, channel coding is determined by analyzing network performance statistics (in field data) for a plurality of wireless device types and for the registered wireless device, comparing the network performance statistics of the plurality of wireless device types and the registered wireless device and choosing the channel coding for the registered device type based on its performance compared to the plurality of wireless device types. A person of ordinary skill in the art will recognize that there are many ways to analyze and compare network performance statistics. For example, in a CDMA DO system, one means of comparing is to look at the average forward link DRC a piece of equipment requests. For CDMA, there are 14 different forward air rates that can be requested, based upon the carrier to interference level (C/I) of the Pilot signal seen at the wireless device. In other words, the stronger the signal seen at the wireless device, the higher the forward data link speed requested by the wireless device. Similarly, the weaker the signal seen at the wireless device, the lower the forward data link speed requested by the wireless device.

Every data speed requested corresponds to C/I detection signal strength required for 1% Packet Erasure Error (PER). The average DRC rate can be averaged across all wireless devices of a given type in the system compared to all the other wireless device types in the system, perhaps even averaged nationwide by a carrier. One such method, for example, may be to take the bottom 20% worst performing wireless device types and assign them the highest amount of coding (i.e., largest number of message repeats). The average of the DRC rates requested by these bottom 20% of wireless devices can be used as a baseline to compare the better wireless device types against. From the differences in average requested DRC rates from device type to device type, a db performance value can be determined. Now knowing the relative db performance difference between the wireless device types, the db difference can be translated into a coding type. In CDMA EVDO, the control channel messages are repeated either 8 times (76.8 Kbps control channel rate) or 16 times (38.4 Kbps control channel data rate). Since there is a known db difference in the detection between 8, 7, 6, 5, 4, 3, 2, or a single transmission, the db difference can be converted to a coding specific coding (i.e., number of repeats used) for each device type.

Referring back to FIG. 4, at step 312, the BSC 118 sends a message to the base station where the wireless device 104 has registered. The message, in one embodiment, includes the determined channel encoding information for the wireless device 104. The control flow then exits at step 314.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for determining a coding type to be used to dynamically encode a control channel for transmitting messages to a wireless device based on capability information associated with the wireless device, the method comprising:
    determining that a wireless device has registered with a base station;
    retrieving a device profile associated with the registered wireless device;
    in response to retrieving the device profile, determining a device type and set of performance capabilities associated with the registered wireless device;
    analyzing network performance statistics for a plurality of wireless device types and for the registered wireless device;
    comparing the network performance statistics of the plurality of wireless device types and the registered wireless device; and
    determining a coding type for a control channel for sending messages to the registered wireless device based on the device type, set of performance capabilities associated with the registered wireless device, and comparison of the network performance statistics of the plurality of wireless device types and the registered wireless device, wherein the coding type specifies a number of message repeats.

2. The method of claim 1, further comprising:
    sending the coding type to the base station.

3. The method of claim 1 further comprising encoding a control message based on the coding type, wherein the message is to be transmitted to a wireless device.

4. The method of claim 1 wherein determining a coding type comprises:
    determining that a subset of the set of performance capabilities associated with the registered wireless device does not exist; and
    selecting default encoding parameters for the wireless device.

5. The method of claim 4, wherein the default encoding parameters are worst-case encoding parameters.

6. The method of claim 1, wherein the device profile comprises at least one of an International Mobile Subscriber Identity and an International Mobile Equipment Identity associated with the wireless device.

7. An information processing system for determining a coding type to be used to dynamically encode a control channel for transmitting messages to a wireless device based on capability information associated with the wireless device, the information processing system comprising:
    a memory;
    a processor communicatively coupled to the memory; and
    a control channel management module communicatively coupled to the memory and the processor, wherein the control channel management module is adapted to:
    determine that a wireless device has registered with a base station;
    retrieve a device profile associated with the registered wireless device;
    in response to retrieving the device profile, determine a device type and set of performance capabilities associated with the registered wireless device;
    analyze network performance statistics for a plurality of wireless device types and for the registered wireless device;
    compare the network performance statistics of the plurality of wireless device types and the registered wireless device; and
    determine a coding type for a control channel for sending messages to the registered wireless device based on the device type, set of performance capabilities associated with the registered wireless device, and comparison of the network performance statistics of the plurality of wireless device types and the registered wireless device, wherein the coding type specifies a number of message repeats.

8. The information processing system of claim 7, wherein the control channel management module is further adapted to send a message to the base station comprising the coding type.

9. The information processing system of claim 7, wherein the control channel management module is further adapted to encode a control message based on the coding type, wherein the message is to be transmitted to a wireless device.

10. The information processing system of claim 7, wherein the control channel management module is further adapted to:
   determining that a subset of the set of performance capabilities associated with the registered wireless device does not exist;
   selecting default encoding parameters for the wireless device.

11. The method of claim 10, wherein the default encoding parameters are worst-case encoding parameters.

12. The information processing system of claim 7, wherein the device profile comprises at least one of an International Mobile Subscriber Identity and an International Mobile Equipment Identity associated with the wireless device.

* * * * *